INVENTOR
IRVING E. ASKE

April 16, 1968     I. E. ASKE     3,377,847

TESTING MACHINE

Original Filed June 7, 1962     3 Sheets-Sheet 2

INVENTOR
IRVING E. ASKE

BY

ATTORNEY

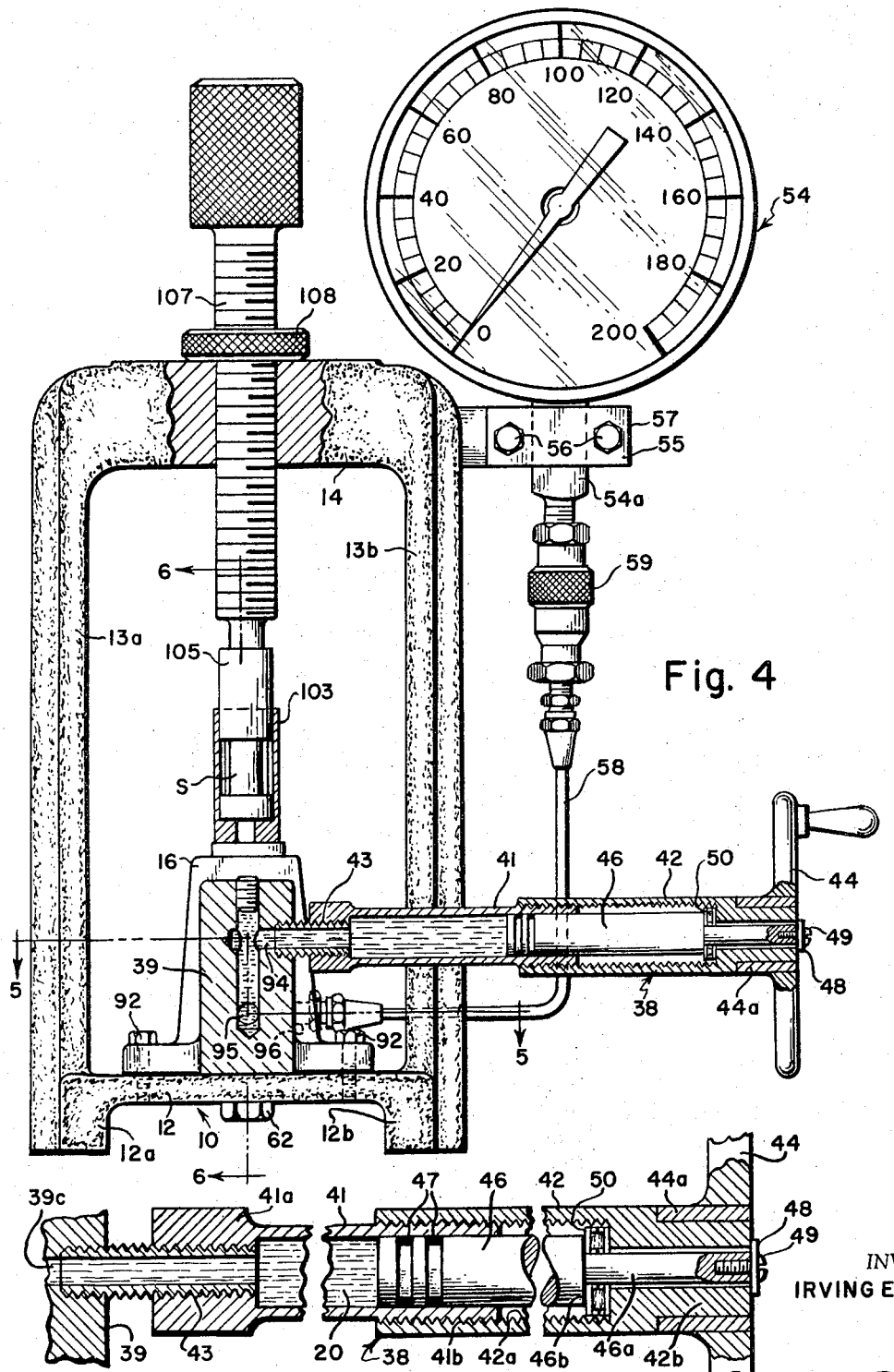

United States Patent Office 3,377,847
Patented Apr. 16, 1968

3,377,847
TESTING MACHINE
Irving E. Aske, 440 46th Ave., St., Petersburg
Beach, Fla. 33713
Continuation of application Ser. No. 200,720, June 7,
1962. This application Mar. 16, 1965, Ser. No. 444,904
1 Claim. (Cl. 73—97)

ABSTRACT OF THE DISCLOSURE

A tensile and compression testing instrument is provided comprising a frame to support material to be tested and to which a hydraulic piston and cylinder are attached, the piston being operated by a convenient hand wheel, the hydraulic pressure being transmitted to a gauge on the frame to indicate the forces applied to the material.

---

The present invention relates to improvements in portable material testing machines for applying relatively light testing loads or tensions to materials, such as up to one thousand pounds. The present application is a continuation of my co-pending application Ser. No. 200,720 filed June 7, 1962 now abandoned.

The principal object of this invention is to provide a relatively inexpensive, portable machine for conveniently and accurately testing a wide variety of materials both in tension and compression to determine their modulus of rupture, flexural strength, coefficient of elasticity, yield and maximum stress, percent elongation, shear in pounds per sq. in. etc., the machine being exceedingly light weight, in the order of less than twenty-five pounds in total weight and including a novel hand powdered hydraulic pump and power unit system assembled with a frame structure by which loads can be applied to materials either in tension or compression as desired through small and closely controlled increments of hydraulic pressure applied to the power unit, the loads being indicated by a pressure gauge connected in the hydraulic system. Preferably, different hydraulic gauges can be conveniently interchanged in the system to suit the various load ranges of different strengths of the materials undergoing specific tests.

A more specific object of the invention is the provision of a novel portable testing machine of the character described comprising a frame having a standard type base including two spaced abutment means, power unit comprising an hydraulic cylinder and piston structure attached to one abutment means and operative to apply a load or tension to material to be tested which reacts with the other abutment means, and an hydraulic pump supported on the frame and operative to transmit liquid under pressure to the cylinder and to a liquid pressure gauge which registers the pressure of the liquid in the pump and cylinder and consequently the force applied to the material undergoing test.

Another object of the invention is the provision of an hydraulic pump comprising two telescoping tubular members, a piston or plunger inside the innermost tubular member and fixed relative to the outer tubular member and movable longitudinally therewith, and means to forcibly telescope the tubular members to cause the plunger to displace fluid from the member in which it is located. Preferably, the telescoping tubular members comprising the pump, are moved in telescoping relation by one member being threaded on the other by relatively fine threads and manually rotated by a crank wheel attached thereto.

Other objects and advantages of the invention will be apparent from the following description of preferred forms thereof, reference being made to the accompanying sheets of drawings wherein:

FIG. 3 is a sectional view of the machine shown in FIG. 1 taken along line 3—3 thereof but showing certain modifications to provide a load test for a bar of material or the like;

FIG. 4 is a front elevational view, partly in section showing another form of testing machine for a compressive test;

FIG. 7 is a fragmentary sectional view of a portion of the hydraulic pump shown in FIGS. 1 and 4, but on a larger scale.

Figures 1, 2:
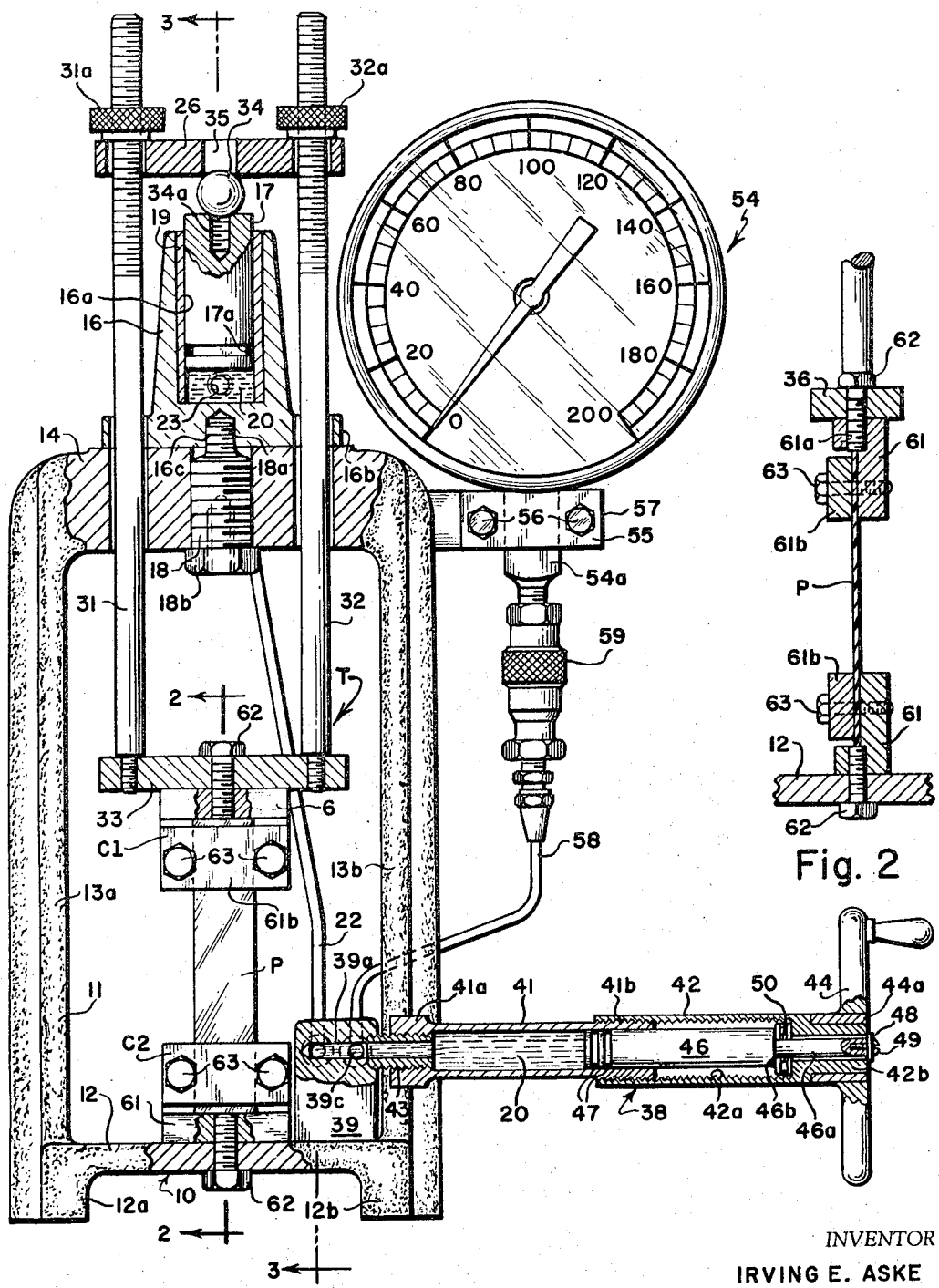
FIG. 1 is a front elevational view partly in section of a testing machine for testing the tensile strength of a strap-like material.
FIG. 2 is a fragmentary sectional view taken substantially along line 2—2 of FIG. 1.

Referring to FIG. 1 of the drawings, a portable testing machine 10 is shown arranged to test the tensile strength of a plastic strap P. Machine 10 preferably comprises a unitary standard cast frame 11 having a base 12, the bottom of which includes parallel runner type legs or standards 12a and 12b which support the base proper slightly above the surface on which the machine rests. Two columns 13a and 13b extend upwardly from opposite sides of base 12 and are interconnected at the top by a yoke portion 14. As seen in the drawing in FIG. 1 the frame is an integral, rectangular open type with a rectangular platform type base surface 12 and is preferably of such size and weight that it can be easily transported manually.

Yoke 14 supports a power unit comprising a cylinder block 16 having an open ended cylinder 16a therein in which a piston 17 reciprocates. The block 16 includes a base portion 16b which rests on yoke 14 and is attached thereto by a plug 18 which projects through an opening through the yoke and has a neck 18a which is threaded into an opening 16c in the bottom of the cylinder block. The lower end of plug 18 has a hexagonal head 18b to facilitate tightening of the plug to firmly draw cylinder block 16 to the yoke. In the form shown, cylinder 16 is lined with an internally polished sleeve 19 press fitted into the bore forming the cylinder to provide a smooth hard surface to receive piston 17. To prevent leakage of fluid between the piston and walls of sleeve 19 piston 17 preferably has a groove portion therein in which an O ring 17a is positioned. Thus, hydraulic fluid entering and leaving the lower end of cylinder 16 will cause piston 17 to rise and fall.

Hydraulic fluid enters and leaves the lower end of the cylinder by way of pipe 22 connected to the lower end of cylinder 16a through bores 23 and 24 in block 16, the connection being effected by a suitable coupling 25 threaded into bore 24. The other end of pipe 22 is connected to an hydraulic pump, described more fully hereinbelow.

Piston 17 moves a tensioning structure T which comprises a cross bar 26 having openings in opposite ends through which two tie rods 31 and 32 loosely project and the upper ends of which are threaded to receive knurled adjusting nuts 31a and 32a which provide for precise adjustment of the elevation of the tie rods. The lower ends of tie rods 31, 32 are threaded in openings through a second cross bar 33 which bar in turn supports a tensioning clamp C1 described more fully hereinafter. Piston 17 is connected to cross rod 26 by a universal joint comprising a ball 34 resting in a threaded opening 34a in the upper end of the piston. Ball 34 is partially received in an opening 35 through bar 26 so that the edges of the opening form a bearing surface on the ball which permits a swivel and self aligning action between the bar and ball. It will be seen that as piston 17 raises and lowers cross bar 33 is correspondingly raised and lowered.

Piston 17 is raised and lowered by hydraulic fluid forced into and removed from cylinder 16a by a pump 38 which is supported on base 12 and connected with the cylinder by a tube 22. Pump 38 comprises a support block 39, which is bolted to base 12 by bolts 30, only one of which appears in the drawings, and two telescoping tubular members 41 and 42. The left hand end of member 41, as viewed in FIGS. 1 and 4, has an enlarged hex formation 41a and an opening into which a section of a tube 43 is sealingly threaded, and the projecting end of which tube is threaded into a bore 39a in block 39 to support member 41 so that the interior thereof is in communication with bore 39a. The right hand end of member 41 is slightly enlarged and is threaded at 41b to receive threads 42a which are formed along the inside of member 42 so that when the latter is rotated, threads 41b and 42a cooperate to cause member 42 to travel longitudinally of member 41, depending on the direction of rotation. Preferably, the threads are relatively fine so that relative movement of the tubular members may be precisely controlled. The right hand end of member 42 has a necked portion 42b which receives the hub 44a of a hand wheel 44 which is suitably keyed to neck portion 42 so that member 42 may be conveniently rotated by the hand wheel.

A piston or plunger 46 closely fits in member 41 and its left hand end has a pair of circumferential groove containing O rings 47 which prevent passage of hydraulic fluid between the plunger and cylinder walls. The right hand end of plunger 46 has a neck portion 46a which projects loosely through an axial opening through neck 42b and the outer end of which neck portion has a washer 48 secured thereto by a screw 49 threaded into the end of the neck portion whereby the washer engages the end of neck 42b to prevent movement of the plunger to the left. A needle type bearing 50 is interposed between the reduced end wall of member 42 and shoulder 46b of plunger 46, shoulder 46b being retained against the bearing by slight pressure of screw 49 on washer 48. It will be appreciated that bearing 50 minimizes the rotative force of member 42 on plunger 46 as member 42 forces the plunger to the left, and the friction of the plunger and O ring 47 on member 41, which is fixedly secured to block 39, prevent the plunger from rotating when member 42 is rotated by hand wheel 44. It is to be noted that washer 48 is not tightly drawn to the end of member 42 and therefore offers but slight turning force to the plunger so that the plunger does not rotate. It will be seen that by rotating hand wheel 44 member 42 is threaded over member 41 moving plunger 46 into member 41 and displacing fluid 20 therefrom.

The fluid forced from member 41 passes through bore 39a and a cross bore 39b to tube 22 which is connected to bore 39b by a usual type connection 51 which includes a portion threaded into bore 39b. It will be seen that hydraulic fluid forced from member 41 passes through tube 22 to cylinder 16a.

To measure or indicate the fluid pressure in the system comprising cylinder 16a, tube 22 and pump 38, a suitable pressure gauge of conventional construction is provided which is supported by a bracket 55 attached to the upper portion of frame 11. Gauge 54 may be of the well known Bourdon tube type and includes an inlet neck 54a which is clamped to bracket 55 by bolts 56 and a clamping plate 57. The lower end of stem 54a is attached to a tube 58 through a suitable coupling 59 which is preferably of the well known type which has a check valve to prevent escape of liquid from the line when neck 54a is removed therefrom so that gauges of different pressure ranges may be conveniently substituted as required. The lower end of line 58 is connected to a cross bore 39c which intersects bore 39a.

Figure 3:
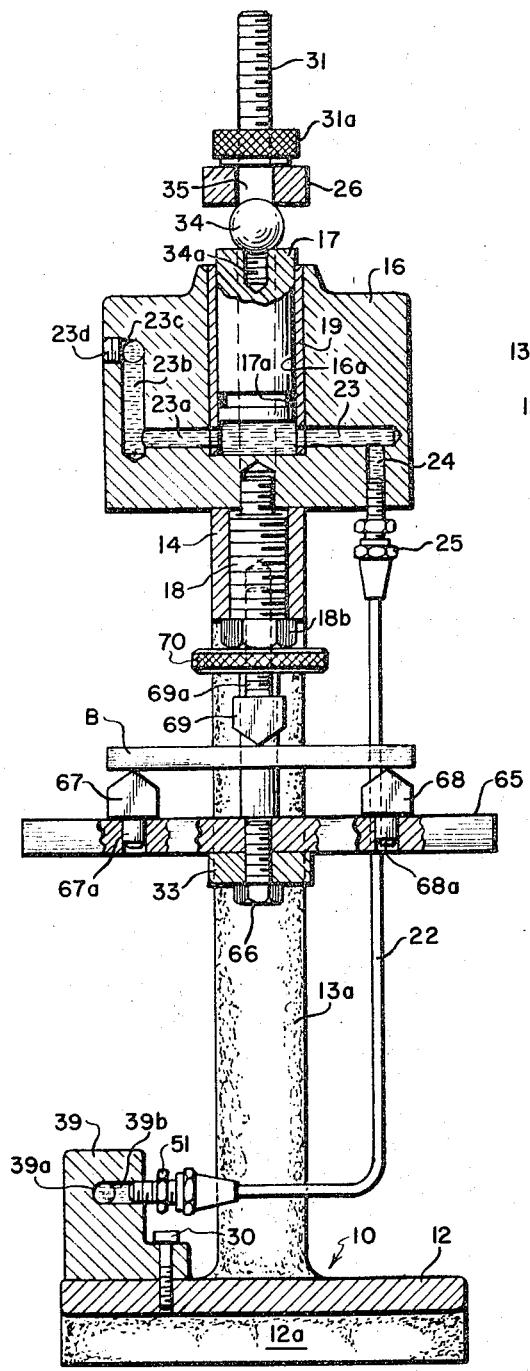

At the time of manufacture of the instrument, cylinder 16a, member 41, tubes 22, 58 and gauge 54 are all evacuated and filled with a suitable hydraulic fluid 20 so that all air is excluded and a solid liquid fill is obtained. The evacuation and filling may be accomplished through a passage formed by bores 23a, 23b, and 23c as seen in FIG. 3, the passage being closed by a threaded plug 23d in bore 23c.

Preferably, the cross-sectional area of the interior of tubular member 41 is one half the cross-sectional area of the inside of cylinder sleeve 19 or piston 17 so that the ratio of movement of plunger 46 to piston 17 is 2:1 and accordingly the piston will exert a force or thrust on cross bar 26 twice that registered by gauge 54 or that pressure at the end of plunger 46.

It will be apparent that the upward movement of cross bar 33 of structure T may be utilized to test various types of materials, and in FIG. 1 the tensile strength of a plastic strip P is shown undergoing test, the ends of the strip being secured in clamps C1 and C2 each comprising an L-shaped member 61 having a threaded opening therein into which a securing bolt 62 is threaded by extending the bolts through openings through cross bar 33 and base 12 respectively. Strip P is placed against the vertical surfaces of members 61 and clamp bars 61d are placed against the strip end portions are are clamped to the vertical portions 61 by bolts 63 extending through the clamp bars and threaded into openings through the clamp members 61 so as to securely fasten the test strip in place as may be seen in FIG. 2.

In conducting the test the operator rotates hand wheel 44 to increase the fluid pressure in cylinder 16a and notes the pressure at which the strip parts. Preferably, for accuracy, gauge 54 is the type in which a resettable pointer 54a is moved over a dial 54b to indicate the maximum pressure developed inasmuch as the strip may part suddenly so that the pressure will be quickly reduced and the operator may fail to observe the parting pressure.

It will be appreciated that rotation of wheel 44 permits the operator to accurately and quickly apply critical tension to the test strip and that considerable movement may be imparted to piston 17 to provide movement necessary to part an elastic test strip.

Referring to FIG. 3, testing machine 10 is shown arranged to provide a load test on a bar B. In this test clamps C1 and C2 are removed from the cross bar 33 and base 12, and a load bar 65 is attached to the top side of bar 33 by a bolt 66 threaded in a central opening through load bar 65. Two blocks 67 and 68 are positioned on bar 65 equal distant from the center thereof which blocks have dowels 67a and 68a which are received in openings through bar 65, spaced equi-distant from the center of the bar, and the upper surfaces of which blocks have sharp ridges for receiving test bar B. A third load bar 69 having a threaded shank 69a is supported from yoke 14 by threading the stem into a threaded opening in plug 18, and to secure the block in position a knurled nut 70 is threaded thereon to be forced against the underside of nut portion 18b to create frictional locking pressure. By turning pump wheel 44 to increase the fluid pressure in cylinder 16a, piston 16 increases the lifting force on bar 33 to the pressure at which bar B breaks, the breaking pressure being indicated by the gauge.

Figure 5:
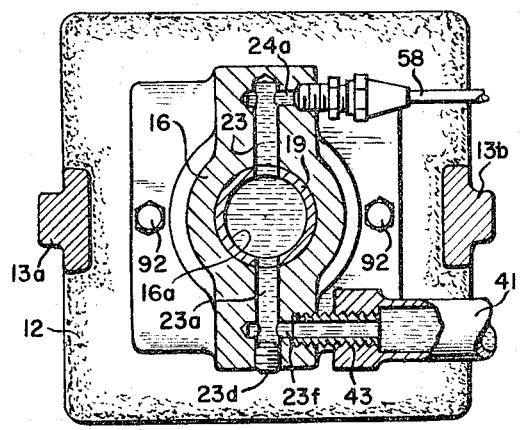
FIG. 5 is a sectional view taken along line 5—5 of FIG. 4.
Figure 6:
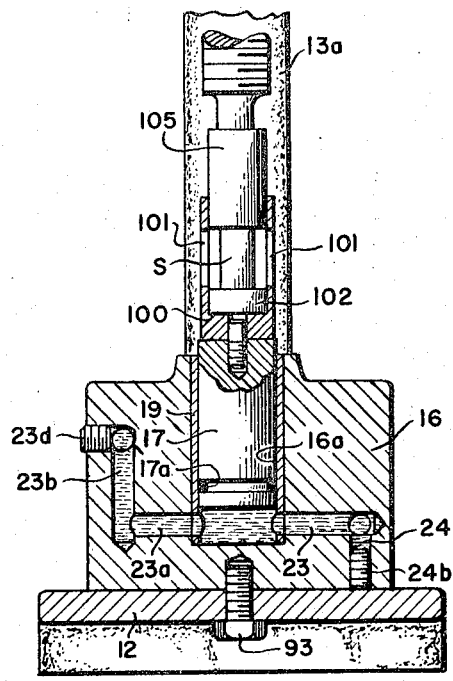
FIG. 6 is a sectional view taken along line 6—6 of FIG. 4.

Referring to the form of testing device shown in FIGS. 4, 5 and 6, a machine 90 is shown for applying compressive loads to test specimens. In many respects machine 90 is like machine 10 and like parts are referred to by the same reference characters. In the present form of the invention, the hydraulic power unit is supported on platform 12 and is like that described with reference to cylinder block 16, piston 17, etc., and like parts are referred to by the same reference characters. In this instance cylinder body 16 is bolted to base 12 by bolts 92 and 93, as shown. One significant difference in the machine shown in FIGS. 4, 5 and 6, is that the tubular section 43 of pump 38 is threaded into a bore 23f which intersects bore 23b, and block 39 and tube 22 are omitted. Gauge tube 58 is attached in a bore 23a intersecting bore 23 and bore 24 is sealed by a threaded plug 24b. It will be seen that hydraulic fluid pressure is applied to piston 17 by pump 38 in the same manner as described hereinbefore and that the gauge 54 registers the pressure in the hydraulic system so that the load or force applied to the material under test can be accurately known.

In the form of the invention shown in FIGS. 4 through 6, means are shown for conducting compressive loading tests to material and comprise a metal or rigid cylindrical shell 100 having window-like openings 101 in opposite sides thereof and a hardened plug-like anvil 102 is located in the bottom thereof, which anvil has a dowel 102a which extends through an axial opening in the shell and is received in a centering bore in piston 17. A test specimen S is supported on the anvil and a cylindrical plug 105 is arranged to enter the upper end of shell 103 and apply a compressive force to the specimen. Plug 105 is supported on the lower end of a threaded shank 107 threaded through opening 14a in yoke 14 and locked in its proper position by a knurled lock nut 108, as shown. When fluid pressure is applied to the bottom of piston 17 by pump 38 the piston is moved upwardly to apply pressure to the test specimen within the test cylinder, and gauge 54 will then register the pressures required to crush the specimen.

It will be understood that other forms of testing fixtures may be employed as conditions dictate, and it will be apparent that other forms, modifications and adaptations of the invention may be employed all falling within the scope of the claim which follows.

I claim:
1. A testing machine comprising a frame, an hydraulically powered unit carried on said frame, means to force fluid to said unit comprising a first tubular member rigidly attached at one end to said frame whereby said member is supported in cantilever fashion, a second tubular member threaded over the other end portion of said first tubular member so as to move longitudinally along said first member when rotated thereon, said second member having its outer end extending beyond said other end of said first member, means to rotate said second tubular member on said first tubular member, said second member having a section of reduced inside diameter adjacent said outer end, said reduced diameter forming an annular radially extending shoulder inside said second member, a plunger in said first tubular member and having a portion projecting from said first tubular member into said second tubular member and including a neck extending into said reduced diameter section of said second member and an annular shoulder about said neck and facing said radially extending shoulder, means on said neck engaging the outer end of said second member to prevent axial movement of said plunger in one direction relative to said second member, and thrust bearing means between said annular shoulder on said plunger and said annular shoulder to transmit axial thrust exerted by one of said shoulders toward the other while permitting relatively free rotation of said second member relative to said plunger.

References Cited

UNITED STATES PATENTS

| | | | |
|---|---|---|---|
| 306,730 | 10/1884 | Emery | 73—103 |
| 324,412 | 8/1885 | Patterson | 73—49.4 |
| 1,066,447 | 7/1913 | Cleveland | 73—97 |
| 1,452,944 | 4/1923 | Webb | 73—102 |
| 2,185,314 | 6/1940 | Raymond | 73—97 X |
| 2,321,875 | 6/1943 | Temple | 73—97 |
| 2,691,943 | 10/1954 | Wilson | 60—54.5 X |
| 2,852,965 | 9/1958 | Wallace | 60—54.5 X |

OTHER REFERENCES

"R.P.C. Testing Machines," Research Products Company, Bulletin 61–C, received Jan. 11, 1962.

RICHARD C. QUEISSER, *Primary Examiner.*

JAMES J. GILL, *Examiner.*

JAMES H. WILLIAMSON, *Assistant Examiner.*